US006198738B1

(12) United States Patent
Chang et al.

(10) Patent No.: US 6,198,738 B1
(45) Date of Patent: Mar. 6, 2001

(54) COMMUNICATIONS BETWEEN THE PUBLIC SWITCHED TELEPHONE NETWORK AND PACKETIZED DATA NETWORKS

(75) Inventors: Young-fu Chang, Buffalo Grove; John Paul Kozik, Naperville; Chinmei Chen Lee, Woodridge, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/843,480

(22) Filed: Apr. 16, 1997

(51) Int. Cl.[7] .................................................. H04L 12/56
(52) U.S. Cl. .......................... 370/352; 370/356; 370/401
(58) Field of Search .................................. 370/352, 353, 370/354, 466, 401, 465, 474, 356, 410, 389, 522, 360, 402, 403; 445/435; 379/89, 93.08, 93.14, 93.29; 709/200, 225, 202

(56) References Cited

U.S. PATENT DOCUMENTS

| 5,548,726 | * | 8/1996 | Pettus | 395/200.09 |
| 5,708,655 | * | 1/1998 | Tooth et al. | 370/313 |
| 5,726,984 | * | 3/1998 | Kubler et al. | 370/349 |
| 5,793,762 | * | 8/1998 | Penners et al. | 370/389 |
| 5,832,506 | * | 11/1998 | Kuzma | 707/200 |
| 6,032,175 | * | 2/2000 | Fletcher et al. | 709/200 |
| 6,055,562 | * | 4/2000 | Devarakonda | 709/202 |
| 6,131,120 | * | 10/2000 | Reid | 709/225 |

OTHER PUBLICATIONS

Preson Gralla, "How the Internet Works" p. 64–67, 1996.*
Xun Qu, "A Practical Method for Achieving Portable Communications in Internet Context", 1995.*
Perkins DHCP for Mobile Networkings with TCP/IP, 1995.*
European Telecommunications Standards Institute (ETSI): GSM Tech. Spec (TS): GSM 01.02, especially section 4.4; Mar. 1996.
ETSI: GSM TS: GSM 03.03; Mar. 1996.
ETSI: GSM TS: GSM 03.08; May 1996.
ETSI:GSM TS: GSM 03.12; Nov. 1996.

* cited by examiner

Primary Examiner—Douglas Olms
Assistant Examiner—Ken Vanderpuye
(74) Attorney, Agent, or Firm—Werner Ulrich

(57) ABSTRACT

A method and apparatus for completing intra-data-network calls and calls between a public switched telephone network (PSTN) and a data network. For the case of an Internet data network, an Internet Phone Register is provided to identify the User Location Service (ULS) server that stores the temporary Internet Protocol Address (TIPA) of a called terminal. Advantageously, the TIPA of any called terminal can then be readily obtained by querying that ULS server.

18 Claims, 8 Drawing Sheets

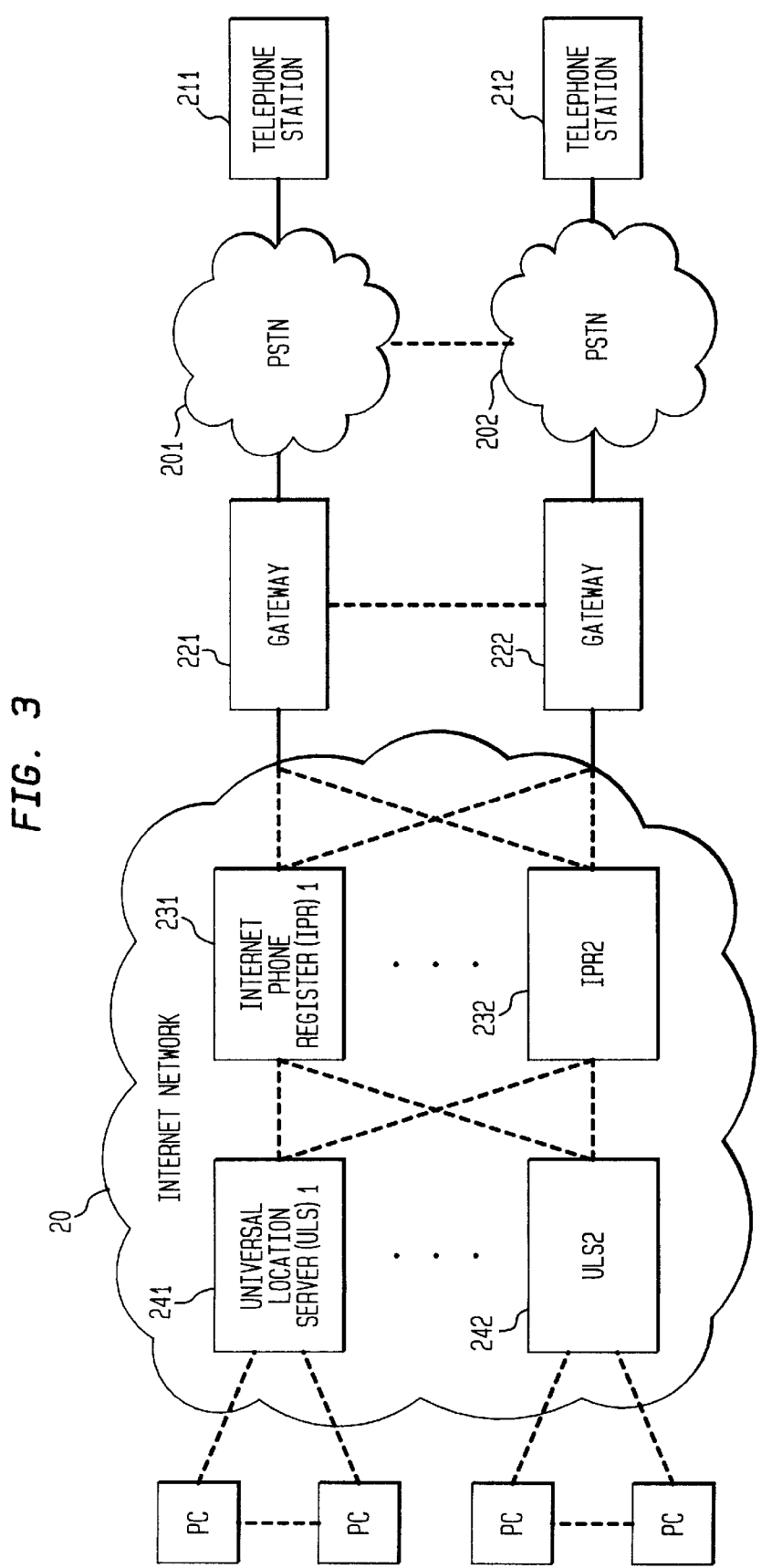

FIG. 4

FOR PSTN TO INTERNET CALL CONTROL:

GATEWAY:

FIND IPR FOR PC BASED ON CALLED TERMINAL IDENTIFICATION.
QUERY IPR FOR ROUTING INFO (PC'S IP ADDRESS).
MAINTAIN A POOL OF TRANSMISSION CONTROL PROTOCOL/USER DATA PROTOCOL
 (TCP/UDP) PORTS FOR PSTN PARTIES AND ASSIGNS ONE AT CALL SETUP.
ASSIGN RESOURCES, e.g. VOCODER, SWITCHING PATHS, ETC.
CALL CONTROL AND AUDIO CONTENTS INTERWORKING BETWEEN PSTN AND INTERNET
PHONE.

IPR:

LOCATE ULS SERVER WHERE PC REGISTERED BASED ON CALLED TERMINAL IDENTIFICATION.
QUERY ULS SERVER WHERE PC REGISTERED BASED ON CALLED TERMINAL IDENTIFICATION.
RESPOND WITH TIPA TO GATEWAY.

ULS SERVER:

MAP CALLED TERMINAL IDENTIFICATION TO TIPA.
DETERMINE IF PC IS ACTIVE AND ABLE TO RECEIVE CALL.
RESPOND TIPA AND PC STATUS TO IPR.

FIG. 5

For Internet to PSTN call control:

ULS SERVER:

SUPPLY TIPA TO INTERNET TERMINAL.
FIND GATEWAY SERVING PSTN PARTY BASED ON PSTN DIRECTORY NUMBER.
INTERNET TERMINAL ESTABLISHES CONNECTION FROM TIPA TO GATEWAY.

GATEWAY:

MAINTAIN A POOL OF TCP/UDP PORTS FOR PSTN PARTIES.
RESPOND TO TERMINAL REQUEST BY ASSIGNING TCP/UDP PORTS FOR INTERWORKING WITH THE PSTN PARTY.
ASSIGN GATEWAY RESOURCES, INCLUDING VOCODER, CIRCUIT SWITCHING PATHS, ETC.
CALL CONTROL AND AUDIO CONTENT INTERWORKING BETWEEN PSTN AND INTERNET TERMINAL.

FIG. 6

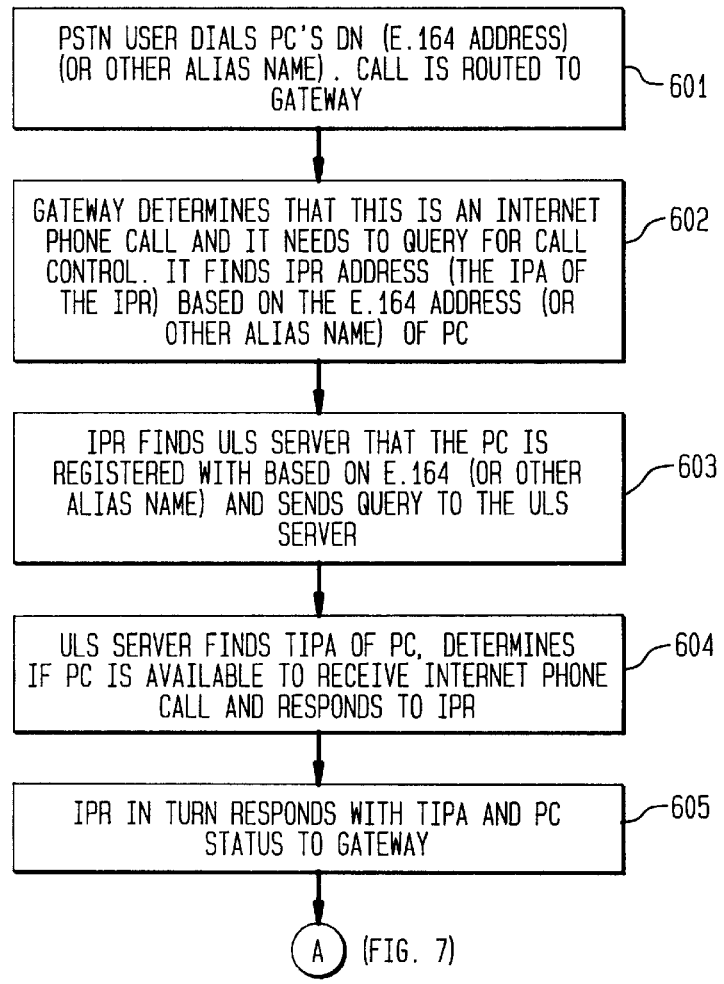

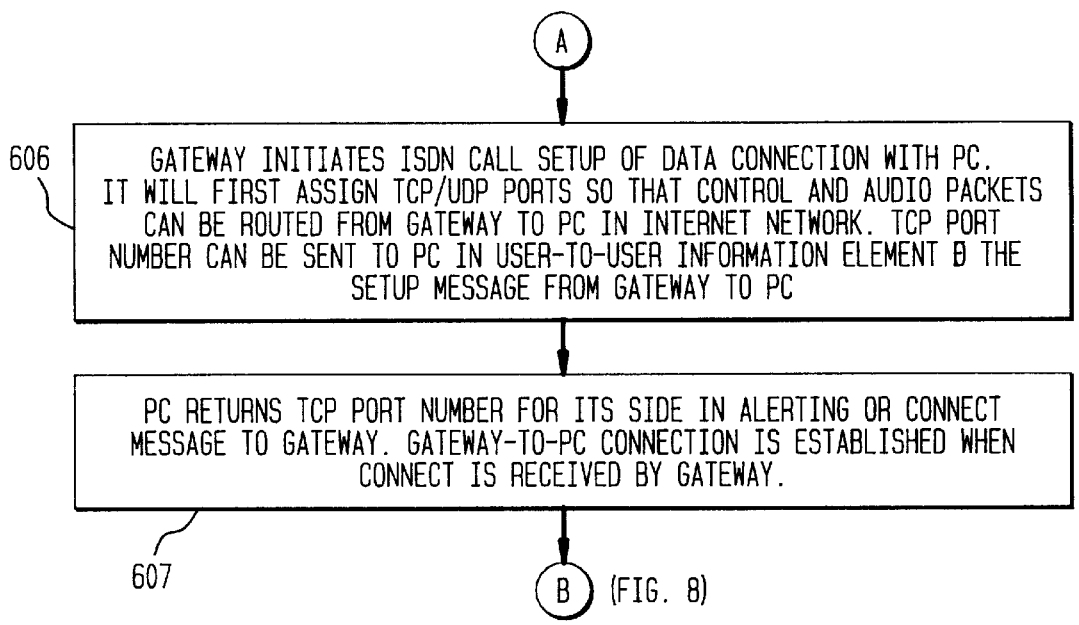
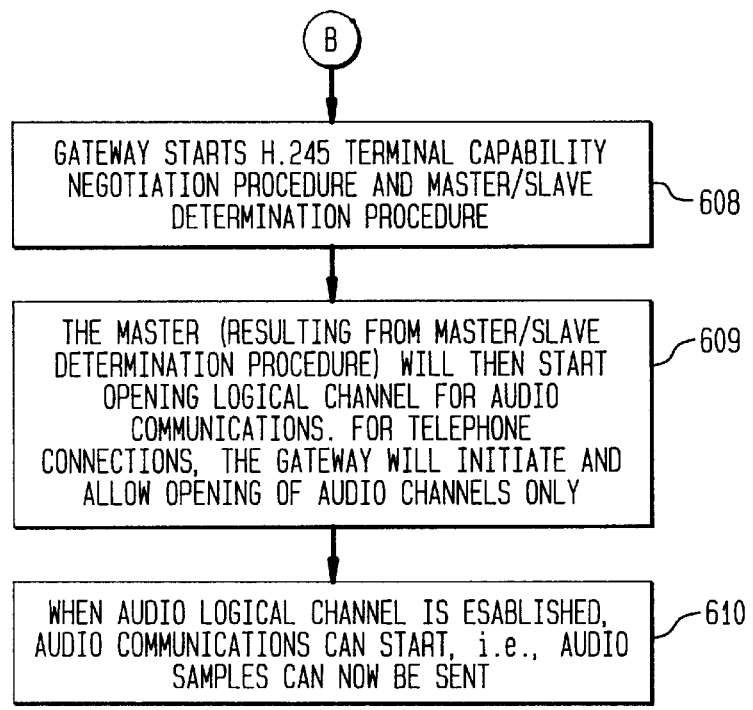

COMMUNICATIONS BETWEEN THE PUBLIC SWITCHED TELEPHONE NETWORK AND PACKETIZED DATA NETWORKS

TECHNICAL FIELD

This invention relates to arrangements for permitting calls between customers connected to the public switched telephone network and customers connected to a packetized data network. It also relates to improved communications among customers of the packetized data network.

Problem

The provision of telephone service, using widespread data networks such as the Internet, has become increasingly popular because of the low charges encountered by users of the Internet. Because the Internet provides communications between customers located far apart without charging heavy toll charges and because the Internet carries any type of packetized data, it has become increasingly apparent that the Internet can be used for transporting packetized voice signals. Effectively, the Internet is likely to become a competitive toll carrier for voice and data communications. While many different data networks can provide these services, the Internet is the network most broadly available, so that this application uses the Internet as the preferred embodiment.

The Internet provides excellent facilities for receiving datagrams from originating terminals and transmitting datagrams to terminating customers on the basis of the Internet name of the terminator terminals. The packets destined for a terminal are routed on Internet based on an Internet Protocol Address (IPA). For those terminals which ordinarily do not disconnect, for example, servers, or those terminals who only use a fixed IPA, a translation between the hostname and the IPA is provided by a Domain Name System (DNS). This Domain Name System uses a set of protocols and databases to provide the hostname-to-IPA translation. The DNS provides a hierarchical name space management to meet the need of fast-growing Internet services. DNS servers have pointers to other DNS servers for the case wherein their local DNS knowledge is insufficient. The DNS has an architecture for maintaining a relatively static database.

For most of the present applications of Internet, the terminating terminal is a server, whose IPA is readily accessible. Certain servers, such as E-mail servers, typically do not move and have an IPA that is permanent and provided via a translation from a DNS Server.

For the case of user terminals which move from place to place and which inform the network of their presence by the act of registration, or which use a commonly used protocol wherein they are assigned a temporary IPA (TIPA) each time they register even if they don't move, a Dynamic Directory Service (DDS) is used to provide this translation; in the Internet, a User Location Service (ULS) is one such service. For terminals served by a ULS server, when a terminal moves from one port to another, it may no longer be served by the same ULS server. The ULS may maintain dynamic information about users and the applications they run. While there is an IPA entry for each ULS server in the DNS, no individual dynamic user information is maintained in the DNS for users who are assigned a TIPA whenever they register. The users are dynamically bound to a specific ULS Server, and, importantly, there is no arrangement of identifying the ULS server that individual users are currently registered with.

Accordingly, a first problem of the prior art is that there is no satisfactory arrangement for completing Internet type calls between two customers when the called party has a temporary IPA, unless both are served by the same ULS server, because there is no satisfactory arrangement for identifying the ULS server that a terminating terminal is currently registered in for the purpose of obtaining the temporary IPA of that terminal.

A further problem is encountered in processing calls from a station connected to a public switched telephone network (PSTN) to a terminal connected to a data network such as the Internet. Broadly speaking, such calls can be completed by connecting the PSTN station to a PSTN terminal of a gateway and, in the Internet, connecting an Internet terminal of the gateway to the terminating Internet terminal. The gateway is provided with a vocoder for each conversation supported by the gateway, to translate between voice signals from/to the PSTN station and packetized voice signals to/from the Internet terminal. In the case of Internet customers who receive a TIPA each time they register, whose TIPA must be obtained in order to complete the call, and who wish to be directly accessible from a PSTN telephone without requiring a preliminary telephone call, the same problem is encountered, i.e., the inability to obtain the TIPA assigned to an Internet terminal. Note that in order to minimize access charges for the calling PSTN customer, it is desirable that the PSTN customer access the closest gateway, which has access to multiple DDS or ULS servers owned by multiple service providers. Accordingly, a problem of the prior art is that there is no satisfactory arrangement for completing calls between a caller connected to the PSTN and an Internet or similar network station which has a temporary address such as a TIPA.

Solution

The above problems are solved and an advance is made over the prior art in accordance with our invention, wherein each service provider is equipped with at least one packet phone register (PPR), in the case of Internet, an Internet phone register (IPR). This phone register is a database for identifying the DDS server or ULS server that contains the data for translating between the identity of the called customer and that called customer's temporary address or TIPA. The phone register thus controls access to the DDS or ULS databases. Advantageously, the phone register permits the data network to obtain the TIPA or equivalent of any packet network station. Advantageously, this allows the service provider to screen requests for DDS or ULS data in the PPR or IPR, in order to limit access for customers who should not receive telephone service.

BRIEF DESCRIPTION OF THE DRAWING

FIGS. 1 and 3 are block diagrams illustrating applicant's invention;

FIGS. 2 and 6–11 are flow diagrams of processes used to implement the invention; and FIGS. 4 and 5 show the functions executed by the ULS server, gateway and IPR for a PSTN to Internet call and an Internet to PSTN call.

DETAILED DESCRIPTION

Figure 1:
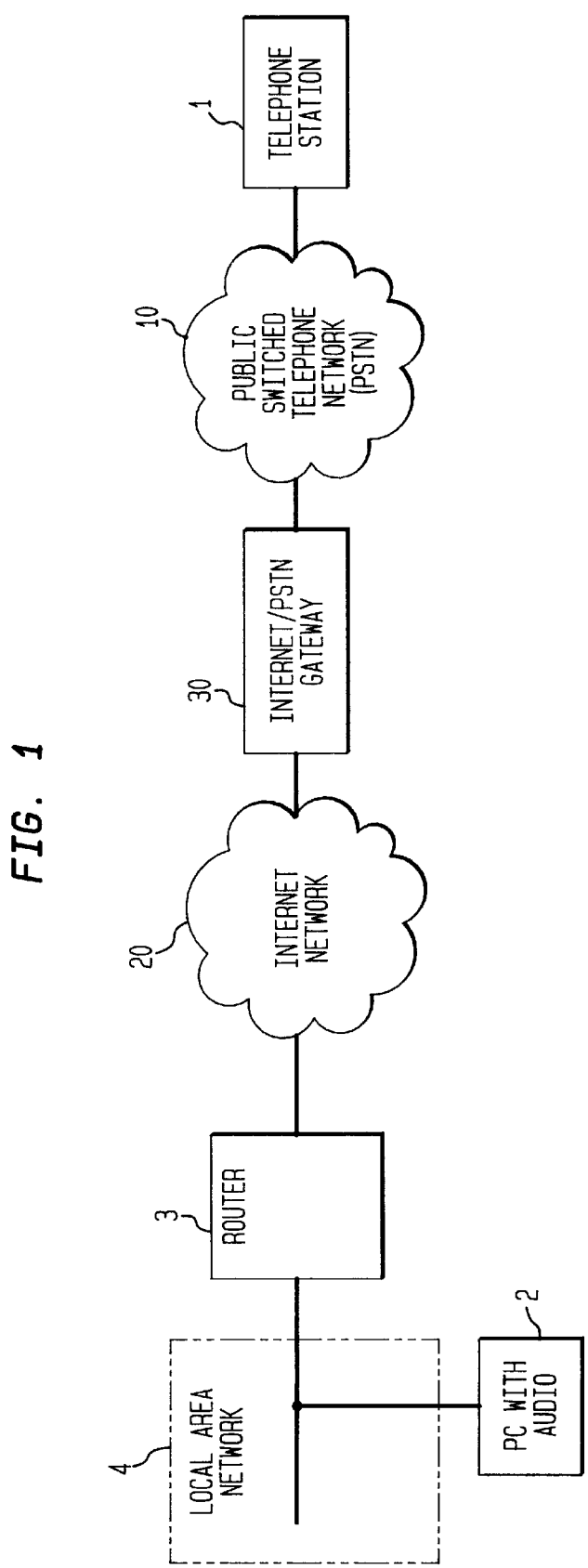

FIG. 1 is a block diagram illustrating the operation of applicants' invention in one preferred embodiment, using the Internet. A subscriber station 1 is attached to the public switched telephone network (PSTN) and a terminal 2 is attached to the Internet network. The terminal 2 is shown as being connected to a local area network 4 which in turn is connected to a router 3 which has access to the Internet network 20. Connecting Internet network 20 and PSTN 10 is an Internet/PSTN gateway 30. The gateway provides the equipment necessary to process call control signals from/to both the Internet and the public switched telephone network and convert between the packetized speech being transmitted over the Internet network 20 and the analog or pulse code modulated (PCM) speech being transmitted over the PSTN 10.

Figure 2:
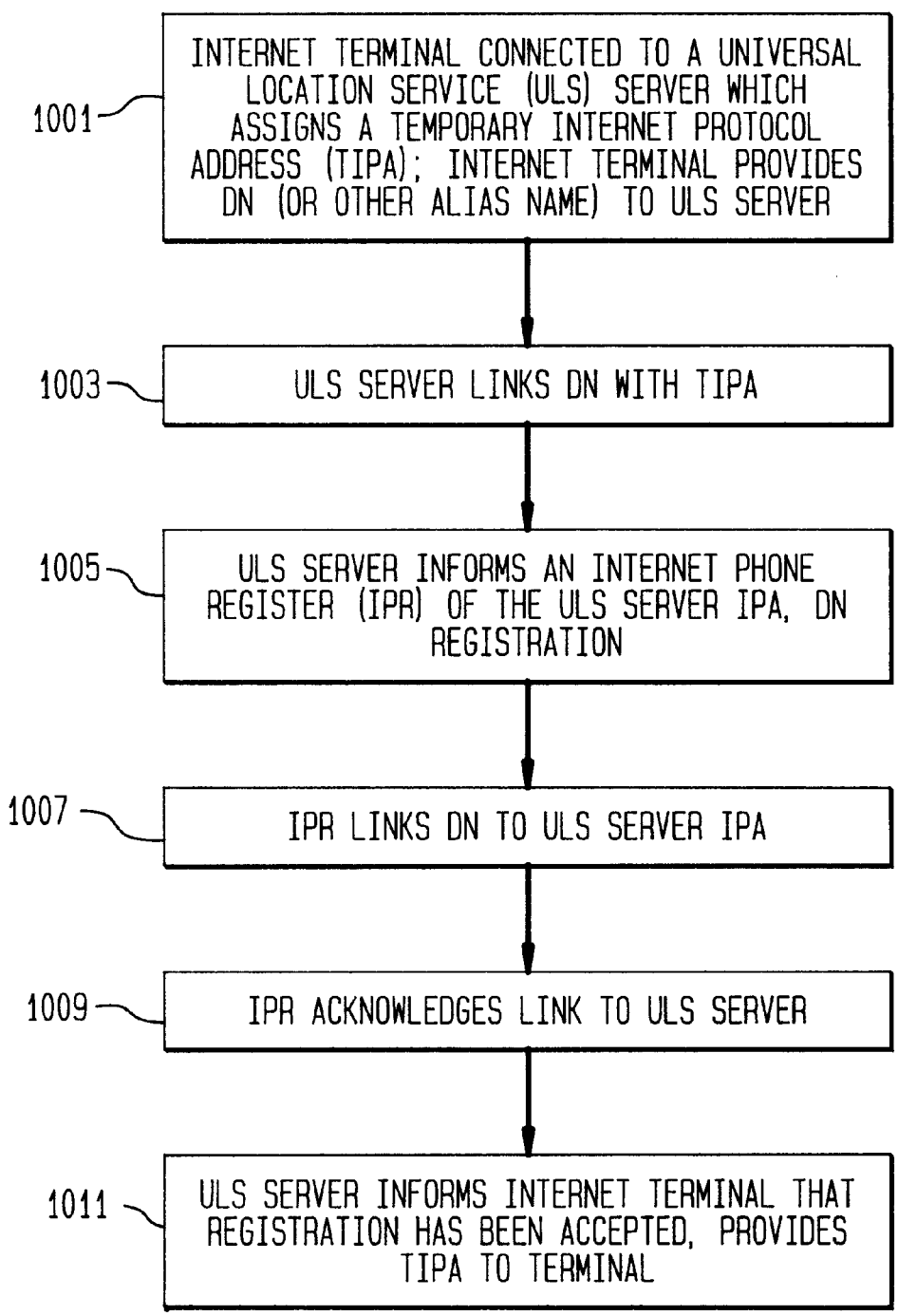

FIG. 2 illustrates the process of registration for an Internet terminal which does not have a fixed IPA associated with its Internet port. The Internet terminal transmits its directory number (or other alias name) to a Universal Location Service (ULS) which assigns a temporary IPA (TIPA) to the terminal (action block 1001). The ULS server links the Internet terminal's directory number to the assigned TIPA (action block 1003). The particular ULS server to which the service request is routed may be based on the location within the network of the port from which the Internet user enters the request or on the user identification. The ULS server informs the IPR of the service provider of that terminal of the directory number registration and the IPA of the ULS server (action block 1005). The IPR links the directory number to the IPA of the informing ULS server (action block 1007). The IPR acknowledges that link to the ULS server (action block 1009). The ULS server then informs the Internet terminal that registration has been accepted and provides the TIPA (action block 1011). The registration of a TIPA, even for a relatively permanent IPA for users who don't normally move, is the same in many implementations. The Internet service provider determines whether all non-server IPAs are treated essentially as if they have TIPAs or whether only those customers having a special class of service are provided with TIPAs which can be changed readily.

FIG. 3 illustrates that the public switched telephone network is actually a plurality of such networks each provided by a different service provider. Shown in FIG. 3 is PSTN 201 connected to station 211 and PSTN 202 connected to station 212. PSTN 201 is connected to gateway 221 and public switched telephone network 202 is connected to gateway 222. Inside Internet network 20 is a plurality of Internet phone registers (IPR) 231, . . . , IPR 232, each of the Internet phone registers for serving one Internet service provider. Each of the Internet phone registers has access to a plurality of ULS servers including ULS servers 241 and 242. The functions of the IPR and the ULS server, both of which are databases, related to the location of an Internet terminal, are discussed hereinafter. In addition, the IPR, the initial database consulted in PSTN to Internet calls, can performs the function of incoming call screening, call interception, call authorization, and unconditional call forwarding for Internet terminals.

FIG. 4 is a table showing the functionality of the different units for controlling PSTN to Internet calls. The gateway must identify the IPR of the terminating station based on a terminal identification, preferably, an E.164 address (which is basically a directory number), or other alias addresses such as a user name or an E-mail address of the terminating terminal. Addresses are assigned in blocks to each IPR, and the gateways each have tables relating each block to its associated IPR. Having identified the IPR, the gateway queries the IPR for routing information to identify the terminating station's temporary Internet phone address (TIPA). The gateway assigns resources such as a vocoder (for converting between packetized speech and analog or PCM speech), a switching path between the PSTN connection and the Internet port, etc. Finally the gateway controls the call between the PSTN and Internet phone. If the PSTN station uses a data or FAX modem, then an appropriate MODEM is inserted in the connection in the gateway. For data channels of an Integrated Services Digital Network (ISDN) station on the PSTN, a different signal converter is required.

For PSTN to Internet call control, the IPR identifies the ULS server where the Internet phone is registered based on the E.164 address or other host alias address. It queries that ULS server for the PC's TIPA and responds with that address to the gateway. Thus the IPR does not actually store the TIPA, but identifies the correct ULS, queries that ULS and then responds with that answer back to the gateway.

For PSTN to Internet calls, each ULS server contains a table to translate between E.164 addresses or other alias addresses and temporary IPAs (TIPAs). The ULS server maintains a record to determine whether the terminating Internet phone is active and able to receive a call and responds with the TIPA and the status of the Internet station to the IPR. Note that the status can include power off wherein the station is not available to accept any calls and may, in fact, not be connected to the network. The busy status includes a status to allow for call waiting and, if no more than one call waiting call is to be allowed, an indication that the status of the Internet phone is already in the call waiting state.

FIG. 5 lists the functions executed on Internet to PSTN calls. When an Internet terminal originates a call, the ULS server receives a message from the Internet terminal indicating the identity of the called station. The ULS server identifies the gateway serving the PSTN terminating party based on that terminating party's E.164 address, a directory number. After receiving the gateway address from the ULS, the Internet terminal establishes a connection to the gateway. In applicants' preferred embodiment, the ULS server is used to identify the gateway; in other embodiments, other servers such as an Internet Phone Server for communicating with a larger database can be used, especially if the choice of gateway becomes a complex decision based on factors other than the Numbering Plan Area (NPA) (the first three digits of a 10 digit directory number) of the called party.

In response to an incoming call from the Internet network, after the gateway has assigned resources for the call, it initiates a call between an outgoing PSTN port and the terminating PSTN telephone, and inserts a vocoder between the Internet port and the outgoing PSTN port. In applicants' preferred embodiment, the gateway is within a PSTN switch such as the 5ESS® switch manufactured by Lucent Technologies Inc.

FIGS. 6–8 illustrate the steps in establishing a PSTN to Internet calls. The PSTN user dials the Internet user's E.164 directory number or other host alias address (action block 601). The amount of data that must be entered to specify, for example, an E-mail address remains unwieldy, so that the preferred arrangement for making this type of call if the called customer does not have an E.164 directory number is to use speech recognition to detect the individual letters of the E-mail address, using a verification announcement to check on ambiguous letters like M and N. Based on this E.164 number or other address, the call is routed to the nearest gateway available in the PSTN of the service provider of the PSTN caller. In applicants' preferred embodiment, one gateway accesses a plurality of service providers; in alternative embodiment, each gateway accesses only one service provider.

The gateway, upon reception of the PSTN to Internet call, determines that this is an Internet phone call and queries the IPR of the service provider of the called customer to receive call control information (action block 602). In the case of an E-mail address, the service provider is a part of the E-mail address, so this is no problem. In the case of an E.164 address, a translation is provided to identify the IPR address. In order to avoid having to provides a very large database for this purpose. The numbering plan should be such that a translation can be readily made to identify an IPR from an E.164 address. This type of numbering plan is well known in the prior art and is used, for example, in wireless networks to identify a home location register.

The IPR identifies the ULS server in which the terminating customer is registered based on its records from the identity of the called E.164 address or alias address (action block 603). The IPR then sends a query to that ULS server. The called terminal had previously registered with that ULS server when that terminal plugged into a port of the Internet network. At that time the ULS server had informed the IPR that it has the TIPA and other information for that Internet customer.

The ULS server finds the TIPA of the called customer and provides the status of that customer which it maintains (action block 604). It responds to the IPR with the status and the TIPA of the called customer. The IPR in turn responds with the TIPA and status of the called terminal to the gateway (action block 605).

The next steps are indicated in FIG. 7. The gateway initiates a Q.931 call setup procedure with the terminating terminal (action block 606). The gateway assigns a transmission control protocol (TCP) port number (also called the Transport Layer Service Access Point (TSAP), to the call for further terminal control negotiation between the gateway and the called terminal through the Internet network. The TCP port number is sent to the PC in a user to user information entity of the Setup message from the gateway to the called terminal.

The called terminal returns the TCP port number for its side in an Alerting or Connect message to the gateway (action block 607). The TCP port is used for the exchange of H.245 signaling messages, in order to establish a communication path for voice or data. A commonly known port number is used by the calling side to cause the called side to execute the proper code when a message to establish the TCP connection is sent to the called party. The calling party sends its TCP port number and the called party returns its TCP port number. The gateway to called terminal connection is established when a Connect message is received by the gateway.

The steps of the call setup are continued on FIG. 8. The gateway then starts a terminal capability negotiating procedure and H.245 master/slave determination using the TCP connection (action block 608).

The master resulting from the master/slave determination procedure then starts opening logical channels for audio communications (action block 609). For telephone connections, the gateway will initiate or allow opening of audio channels only.

When audio logical channels are established, audio communications can take place by having audio packets sent through the Internet network (action block 610).

Figure 9:
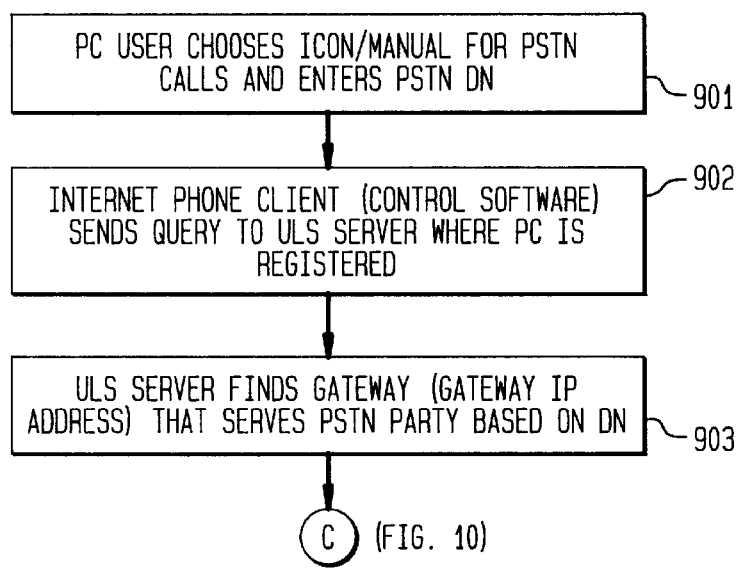
Figure 10:
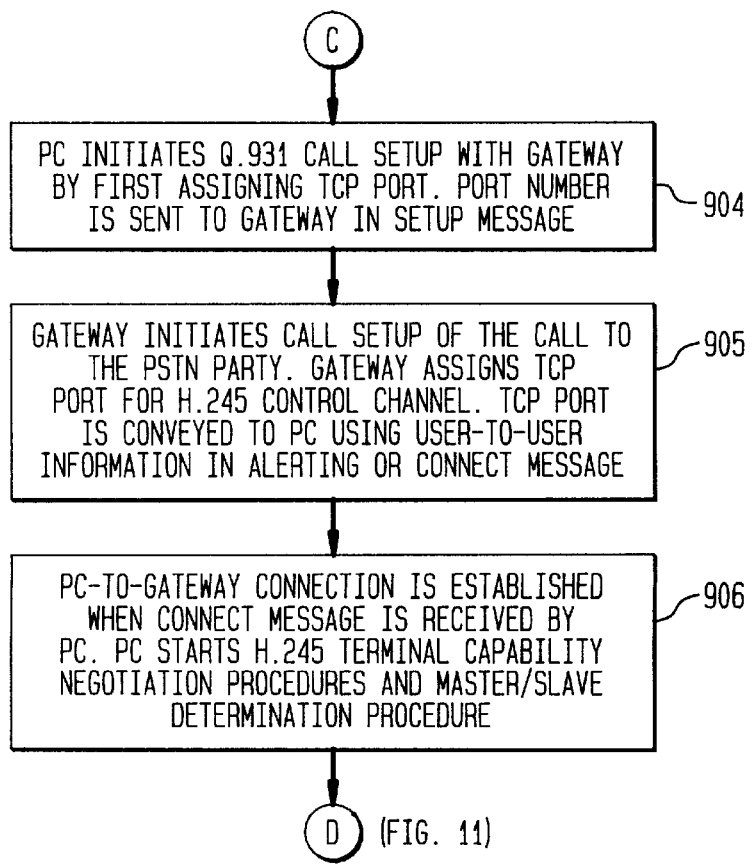
Figure 11:
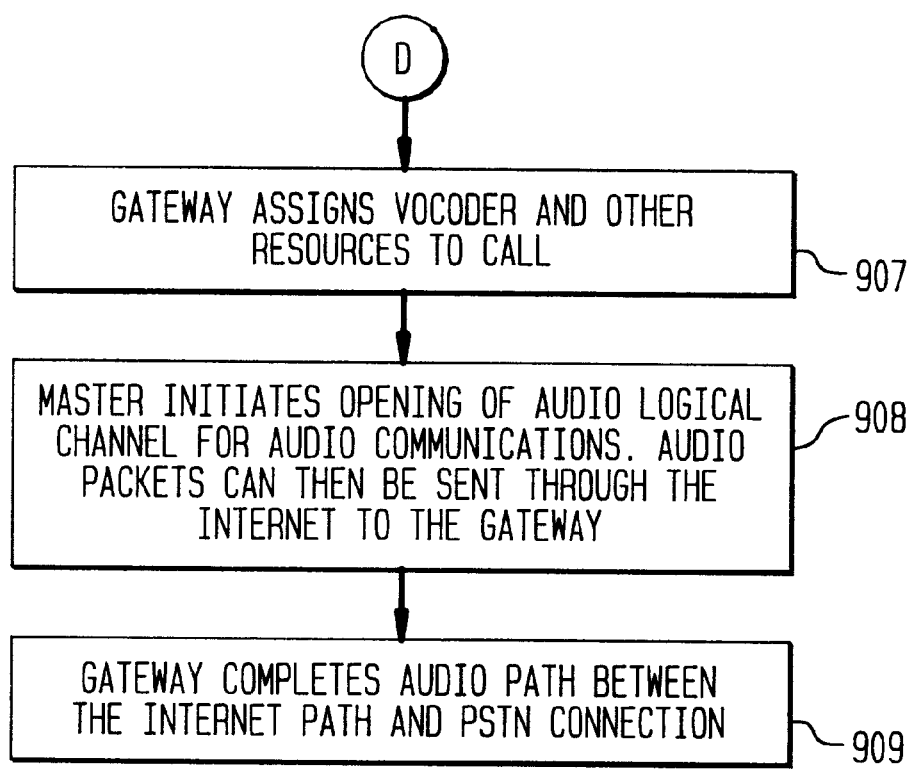

FIGS. 9 and 10 illustrate the operation of an Internet to PSTN calls. The Internet caller (typically, a personal computer or PC) chooses to make a PSTN call by either an icon or a keyboard entered message and enters the PSTN directory number (action block 901). The Internet phone client, i.e, the software in the terminal that supports the Internet phone application, sends a query to the ULS on which the caller is registered (action block 902). The ULS determines the identity of the gateway, i.e., the IPA address of the gateway, that serves the PSTN customer based on the directory number and sends this identity back to the caller (action block 903).

FIG. 10 shows that the caller initiates a Q.931 call setup with the gateway by first assigning a transmission control protocol (TCP) port number (action block 904). This number is sent to the gateway in the Setup message. The gateway assigns a TCP port for the H.245 control channel (action block 905). The TCP port is conveyed to the caller terminal using user to user information in the Alerting or the Connect message.

The caller's terminal to gateway connection is established when the connect message sent from the gateway is received by the caller terminal (action block 906). The caller terminal starts an H.245 master/slave determination and terminal capability negotiation procedures over logical channel 0 of the TCP port. The gateway assigns a vocoder and other resources to the call and initiates the setup of the call to the PSTN party (action block 907).

FIG. 10 then shows that the master initiates opening a logical channel for audio communications (action block 908). When the audio logical channel is established audio communications can begin by sending audio packets through the Internet. The gateway completes the audio path between the Internet path and the PSTN connection (action block 909).

The same arrangement can be used for sending multimedia communications between PSTN stations and Internet terminals. For such a connection, the vocoder is not used for non-audio communications; instead the PSTN user information is converted to Internet packets and vice versa. The conversion may require a modem, or other adaptation, for example, for processing ISDN signals or ATM signals, to match the input from the PSTN terminal to Internet protocol packets.

Calls from one Internet terminal to another Internet terminal are handled in essentially the same way as calls from a PSTN terminal to an Internet terminal, except that only the portion from a gateway terminal to the Internet terminal is executed. In this case, instead of a gateway terminal, the calling Internet terminal requests the connection. It does so by obtaining the TIPA of the called Internet terminal in essentially the same way as the gateway obtains that identification. Once the calling Internet terminal has obtained the terminating TIPA it simply establishes a connection from its own TIPA (recorded in the calling Internet terminal) to that terminating TIPA.

This description is of only one preferred embodiment of applicants' invention. Many other embodiments may be designed by those of ordinary skill in the art without departing from the scope of the invention. The invention is only limited by the attached claims.

What is claimed is:

1. A method of establishing a public switched telephone network (PSTN) to packet network audio connection comprising the steps of:

registering a called terminal in a directory server in the packet network;

responsive to said registration, assigning a temporary address to said called terminal;

specifying an identification of the called terminal from a PSTN caller;

routing the call from the PSTN caller to a PSTN/packet network gateway;

identifying a packet network phone register database, for serving calls to the called terminal;

in said packet network phone register database, determining the identity of a directory server for further serving said called terminal;

querying the identified directory server to determine the temporary address of said called terminal and a status of said called terminal;

said directory server, responsive to said query, determining said temporary address and said status;

in said gateway, assigning a packet network communication path port to said call; and establishing a connection between said packet network communication path port in said gateway and said called terminal in said packet network and another connection between a port of said gateway and said PSTN caller in said PSTN;

wherein the step of identifying a packet network phone register database comprises the step of identifying said packet network phone register database based on the identification of the called terminal.

2. The method of claim 1, further comprising step of assigning a signal converter to said call in said gateway and inserting said signal converter between signals from and to the PSTN and signals from and to said called terminal.

3. The method of claim 2 wherein the step of assigning a signal converter comprises the step of:

assigning a vocoder for generating packetized speech from Pulse Code Modulation (PCM) signals and generating PCM signals from packetized speech signals.

4. The method of claim 2 wherein the step of assigning a signal converter comprises the step of:

assigning a modem in said gateway for converting between packet network signals and PSTN signals.

5. The method of claim 2 wherein the step of assigning a signal converter comprises the step of:

assigning a signal converter for converting between ISDN signals and packet network signals and inserting said signal converter into said connection in said gateway.

6. The method of claim 1, wherein the step of registering the called terminal in the packet network comprises the step of:

registering the called terminal in an Internet or equivalent network;

wherein the packet data network is an Internet or equivalent network.

7. The method of claim 6 further comprising the step of:

assigning a vocoder for converting between Pulse Code Modulation (PCM) and packetized speech in said gateway;

whereby PSTN to Internet audio connection are established.

8. The method of claim 1 wherein the step of specifying the identification of the called terminal comprises the step of specifying a telephone number of a called Internet terminal.

9. The method of claim 1 wherein the step of identifying a packet network phone register database comprises the step of identifying a packet network phone register database for servicing a service provider.

10. Apparatus for establishing a public switched telephone network (PSTN) to packet network audio connection, comprising:

means for registering a called terminal in a directory server in the packet network;

means, responsive to said means for registering, for assigning a temporary address to said called terminal;

means for specifying an identification of the called terminal from a PSTN caller;

means for routing the call from the PSTN caller to a PSTN/packet network gateway;

means for identifying a packet network phone register database, for serving calls to the called terminal;

in said packet network phone register database, means for determining the identity of a directory server for further serving said called terminal;

means for querying the identified directory server to determine the temporary address of said called terminal and a status of said called terminal;

in said directory server, means, responsive to said query, for determining said temporary address and said status;

in said gateway, means for assigning a packet network communication path port to said call; and means for establishing a connection between said packet network communication path port in said gateway and said called terminal in said packet network, and means for establishing another connection between a port of said gateway and said PSTN caller in said PSTN;

wherein the means for identifying a packet network phone register database comprise means for identifying said packet network phone register database based on the identification of the called terminal.

11. The apparatus of claim 10, wherein the means for specifying the identification of the called terminal comprise means for specifying a telephone number of a called Internet terminal.

12. The apparatus of claim 10, wherein the means for identifying a packet network phone register database comprises means for identifying a packet network phone register database for servicing a service provider.

13. The apparatus of claim 10, further comprising means for assigning a signal converter to said call in said Gateway and inserting said signal converter between signals from and to the PSTN, and signals from and to said called terminal.

14. The apparatus of claim 13, wherein the means for assigning a signal converter comprise means for assigning a vocoder for generating packetized speech from pulse code modulation (PCM) signals, and generating PCM signals from packetized speech signals.

15. The apparatus of claim 13, wherein the means for assigning a signal converter comprise means for assigning a modem in said Gateway for converting between packet network signals and PSTN signals.

16. The apparatus of claim 13, wherein the means for assigning a signal converter comprise means for assigning a signal converter for converting between ISDN signals and packet network signals, and inserting said signal converter into said connection in said Gateway.

17. The apparatus of claim 10, wherein the means for registering the called terminal in the packet network comprise means for registering the called terminal in an Internet network.

18. The apparatus of claim 17, further comprising means for assigning a vocoder for converting between pulse code modulation, (PCM) signals and packetized speech in said Gateway.

* * * * *